(12) United States Patent
Takahashi et al.

(10) Patent No.: US 10,402,130 B2
(45) Date of Patent: Sep. 3, 2019

(54) PRINTING SYSTEM AND RELATED CONTROL METHOD IN WHICH A PRINTING APPARATUS CONNECTS WITH A MOBILE TERMINAL IF A PRINTING RESERVATION CORRESPONDING TO A PRINTING INSTRUCTION FROM THE MOBILE TERMINAL IS MANAGED BY A SERVER

(71) Applicant: CANON KABUSHIKI KAISHA, Tokyo (JP)

(72) Inventors: Masayoshi Takahashi, Mishima (JP); Kazuhiko Okazawa, Yokohama (JP); Shigeru Kameyama, Mishima (JP); Hisashi Enomoto, Mishima (JP); Tadashi Fukumuro, Mishima (JP); Yukio Numakami, Tachikawa (JP); Ryosuke Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/117,556

(22) Filed: Aug. 30, 2018

(65) Prior Publication Data

US 2019/0012123 A1  Jan. 10, 2019

Related U.S. Application Data

(63) Continuation of application No. PCT/JP2017/002458, filed on Jan. 25, 2017.

(30) Foreign Application Priority Data

Mar. 3, 2016  (JP) .................................. 2016-041491

(51) Int. Cl.
*G06F 3/12* (2006.01)
*B41J 29/38* (2006.01)
(Continued)

(52) U.S. Cl.
CPC ............ *G06F 3/1236* (2013.01); *B41J 29/00* (2013.01); *B41J 29/38* (2013.01); *G06F 3/12* (2013.01);
(Continued)

(58) Field of Classification Search
CPC .... G06F 3/1236; G06F 3/1217; G06F 3/1292; G06F 3/1288; G06F 3/12; B41J 29/38; B41J 29/00; H04N 1/00
(Continued)

(56) References Cited

U.S. PATENT DOCUMENTS 9,554,004 B2 * 1/2017 Kyoo ................. H04N 1/00408
9,860,399 B2   1/2018 Nishimura et al.
(Continued)

FOREIGN PATENT DOCUMENTS

JP   H09-305340 A   11/1997
JP   2005-088474 A   4/2005
(Continued)

OTHER PUBLICATIONS

International Search Report and Written Opinion dated Jan. 25, 2017, issued in corresponding International Application No. PCT/JP2017/002458.

*Primary Examiner* — Allen H Nguyen
(74) *Attorney, Agent, or Firm* — Venable LLP

(57) ABSTRACT

A printing system includes an image forming apparatus that accepts a printing instruction from a mobile terminal, sends an inquiry to a server as to whether a printing reservation corresponding to the accepted printing instruction is managed by the server, and transmits connection information to the mobile terminal if the printing reservation is managed by the server. The image forming apparatus obtains printing data corresponding to the printing instruction from the mobile terminal set in the connected state, executes printing (Continued)

processing using the obtained printing data, and sets communication with the mobile terminal to an unconnected state after execution of the printing processing is complete. If the printing reservation corresponding to the accepted printing instruction is not managed by the server, the printing instruction accepted from the mobile terminal is rejected and the connection information is not transmitted to the mobile terminal.

11 Claims, 16 Drawing Sheets

(51) Int. Cl.
*B41J 29/00* (2006.01)
*H04N 1/00* (2006.01)

(52) U.S. Cl.
CPC ............ *G06F 3/1217* (2013.01); *H04N 1/00* (2013.01); *G06F 3/1288* (2013.01); *G06F 3/1292* (2013.01)

(58) Field of Classification Search
USPC ......................................................... 358/1.15
See application file for complete search history.

(56) References Cited

U.S. PATENT DOCUMENTS

| | | | |
|---|---|---|---|
| 2009/0164999 | A1 | 6/2009 | Tsuboi et al. |
| 2012/0019857 | A1* | 1/2012 | Miyajima .......... G03G 15/5012 358/1.15 |
| 2013/0222840 | A1* | 8/2013 | Hosoda .............. H04N 1/00204 358/1.14 |
| 2015/0227333 | A1* | 8/2015 | Tanaka .................. G06F 3/1267 358/1.15 |
| 2016/0054963 | A1* | 2/2016 | Hamada ................ G06F 3/1273 358/1.15 |
| 2016/0165080 | A1* | 6/2016 | Yamahata .......... H04N 1/00464 358/1.15 |
| 2017/0070642 | A1 | 3/2017 | Miyamoto et al. |

FOREIGN PATENT DOCUMENTS

| | | |
|---|---|---|
| JP | 2009-151686 A | 7/2009 |
| JP | 2013-095039 A | 5/2013 |
| JP | 2015-041298 A | 3/2015 |
| JP | 2015-061088 A | 3/2015 |
| JP | 2015-215854 A | 12/2015 |
| WO | 2017/150015 A1 | 9/2017 |

* cited by examiner

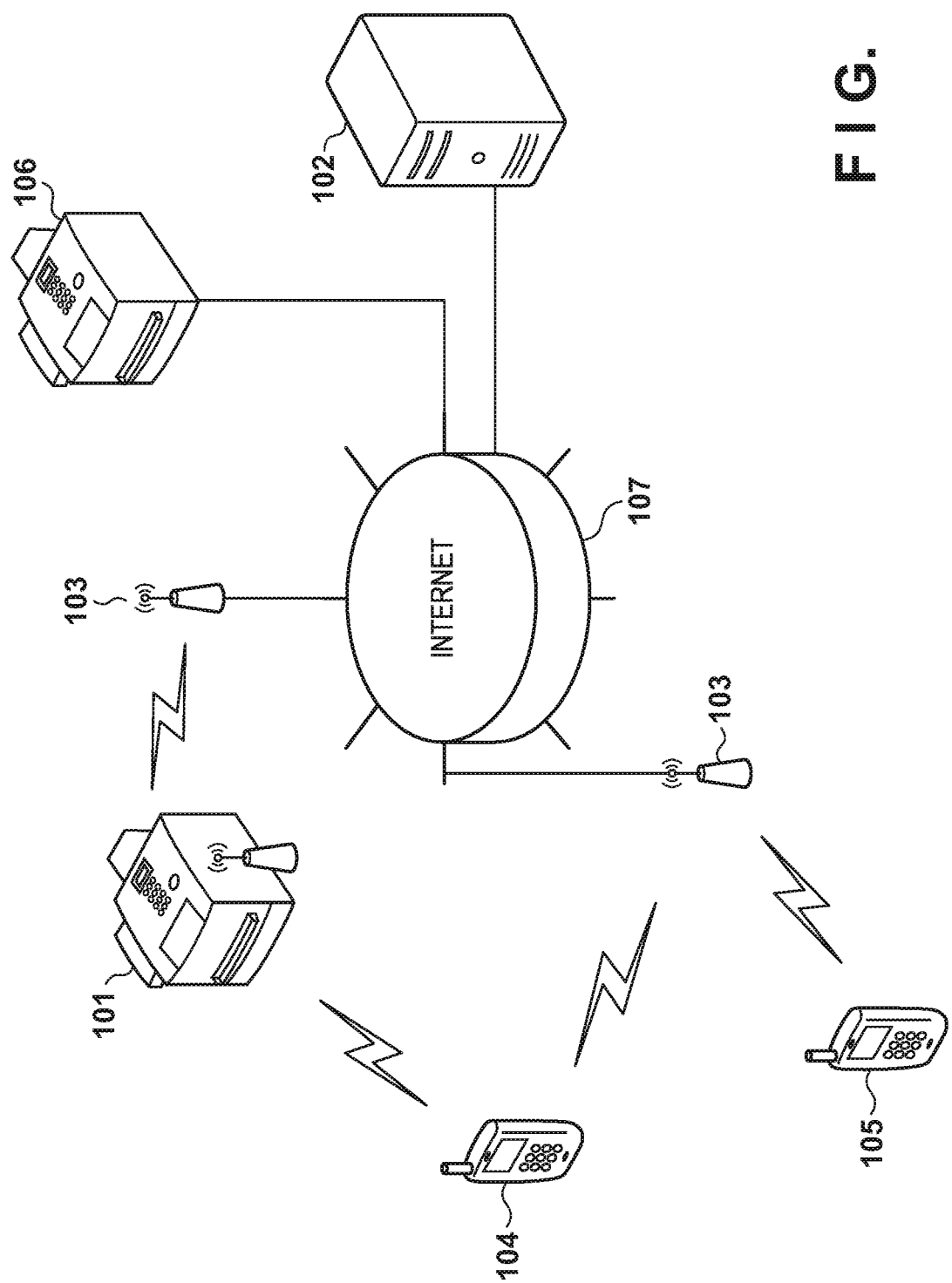

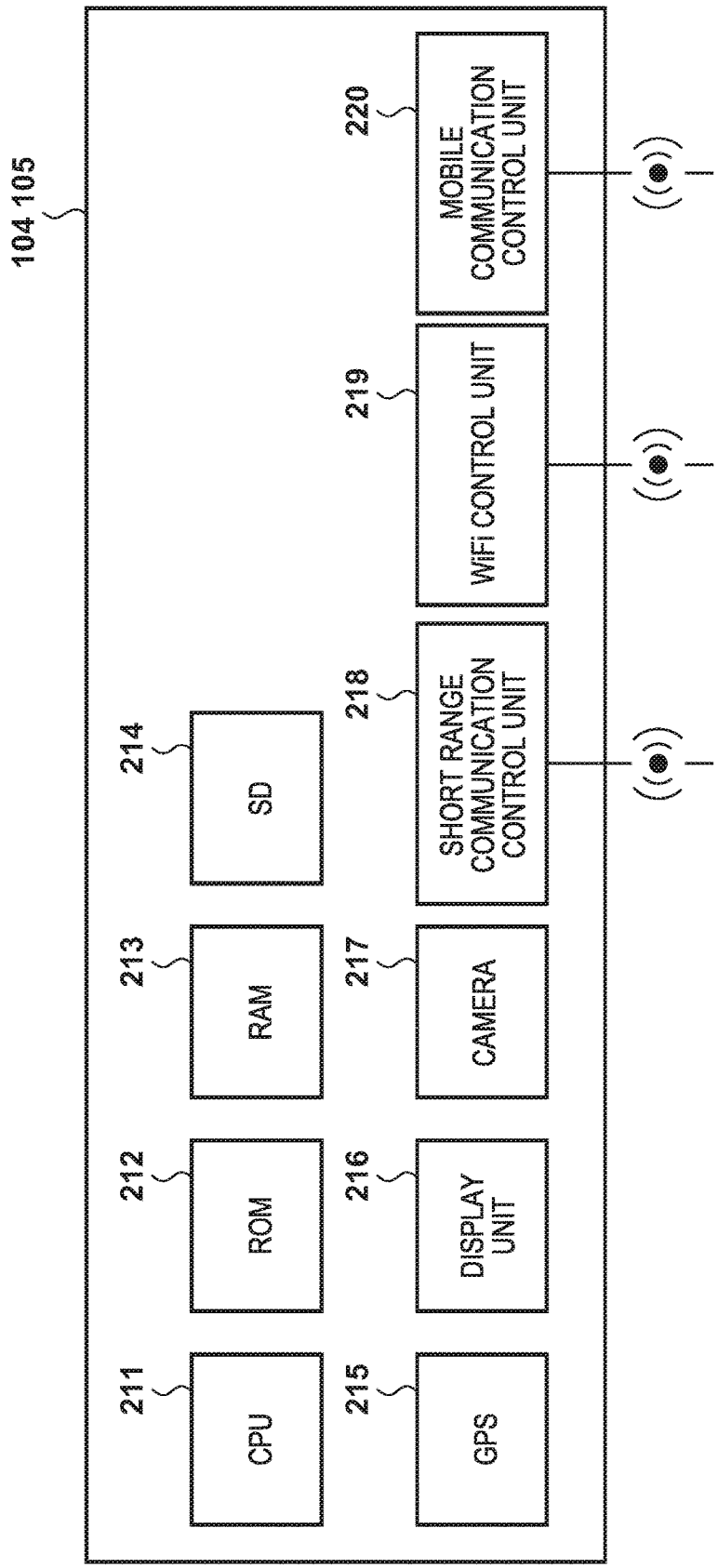

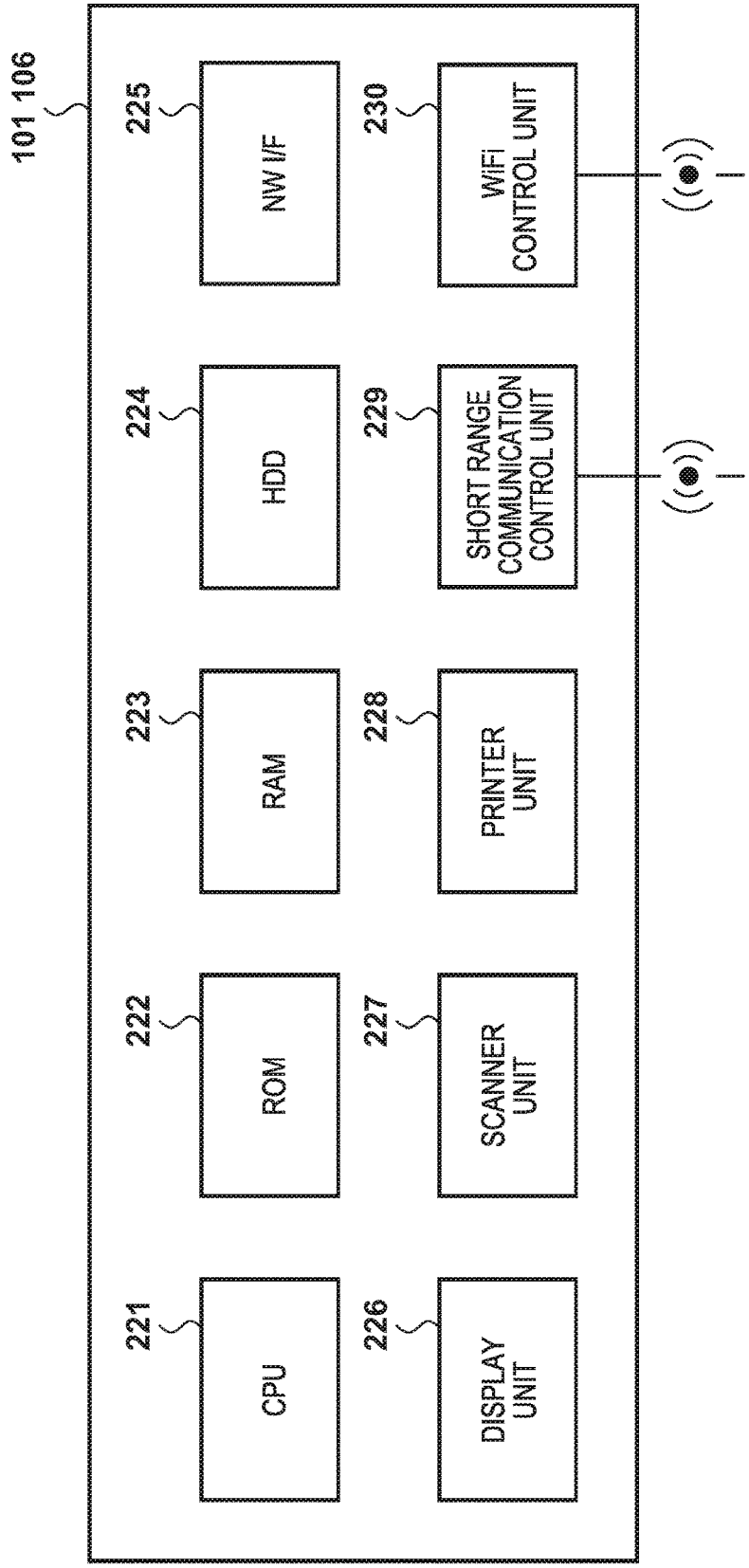

SMARTPHONE
IN Wi-Fi DITHERING

CONNECTED VIA
EXTERNAL AP

PRINTER OPERATED
AS AP ROUTER

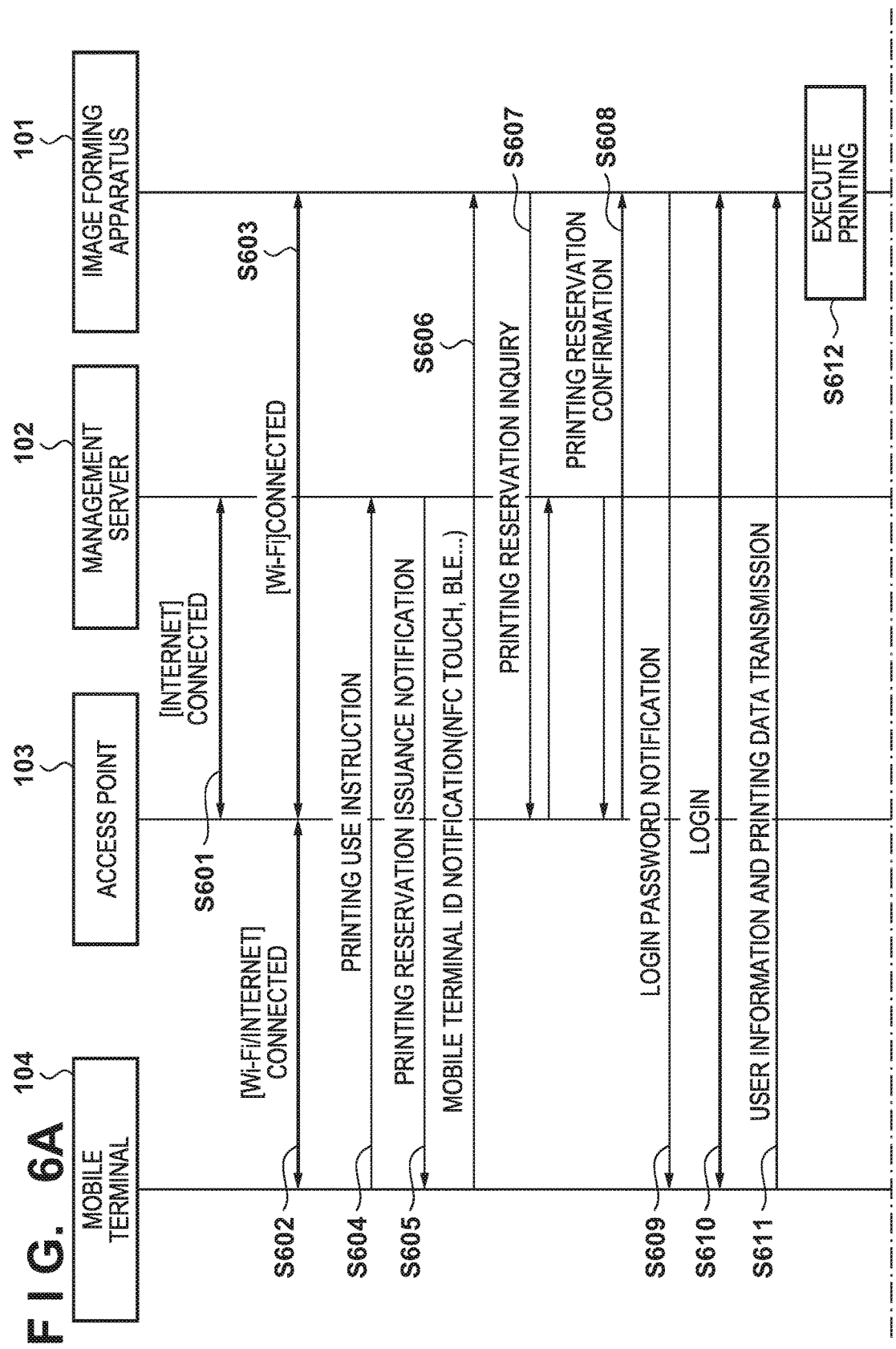

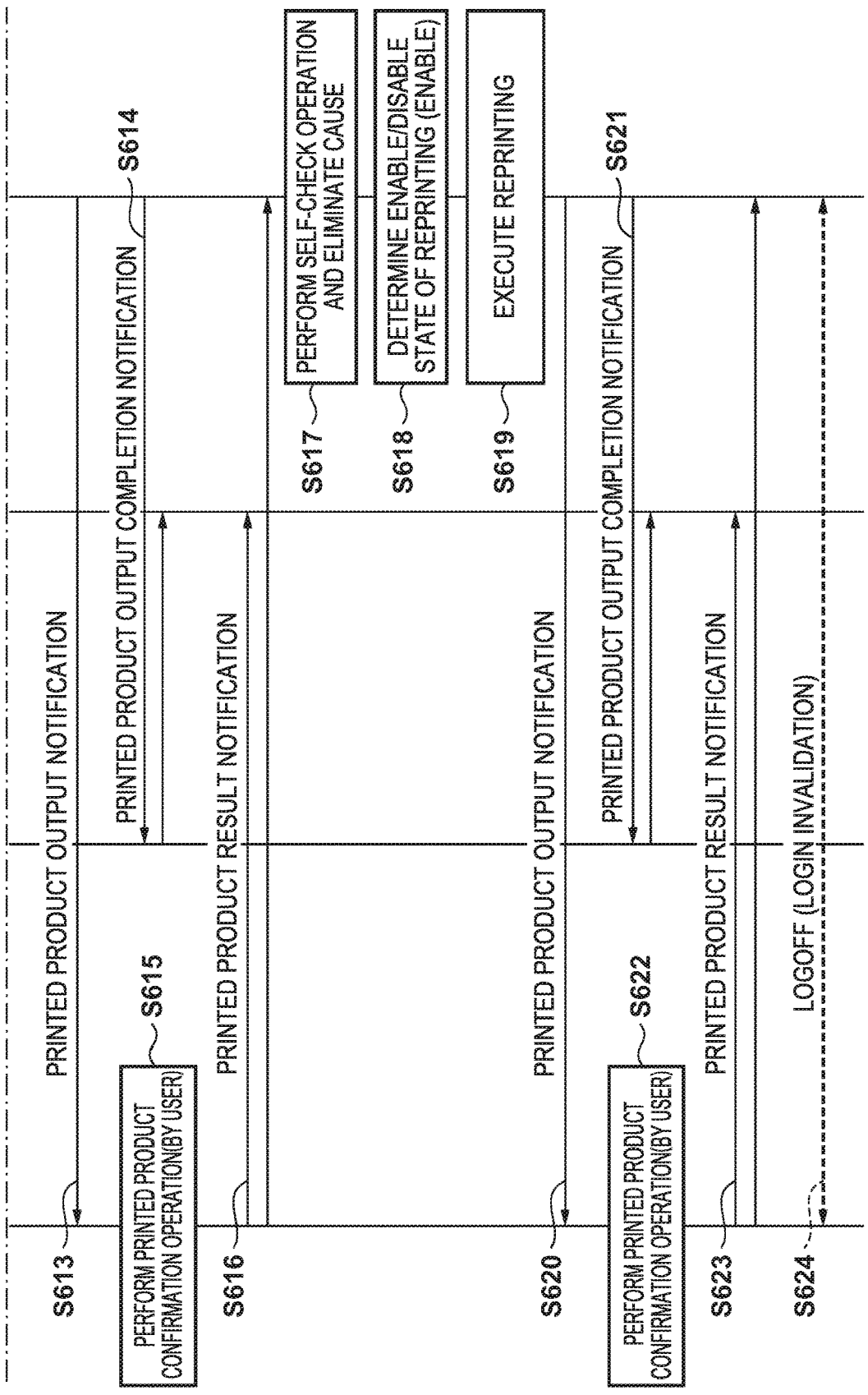

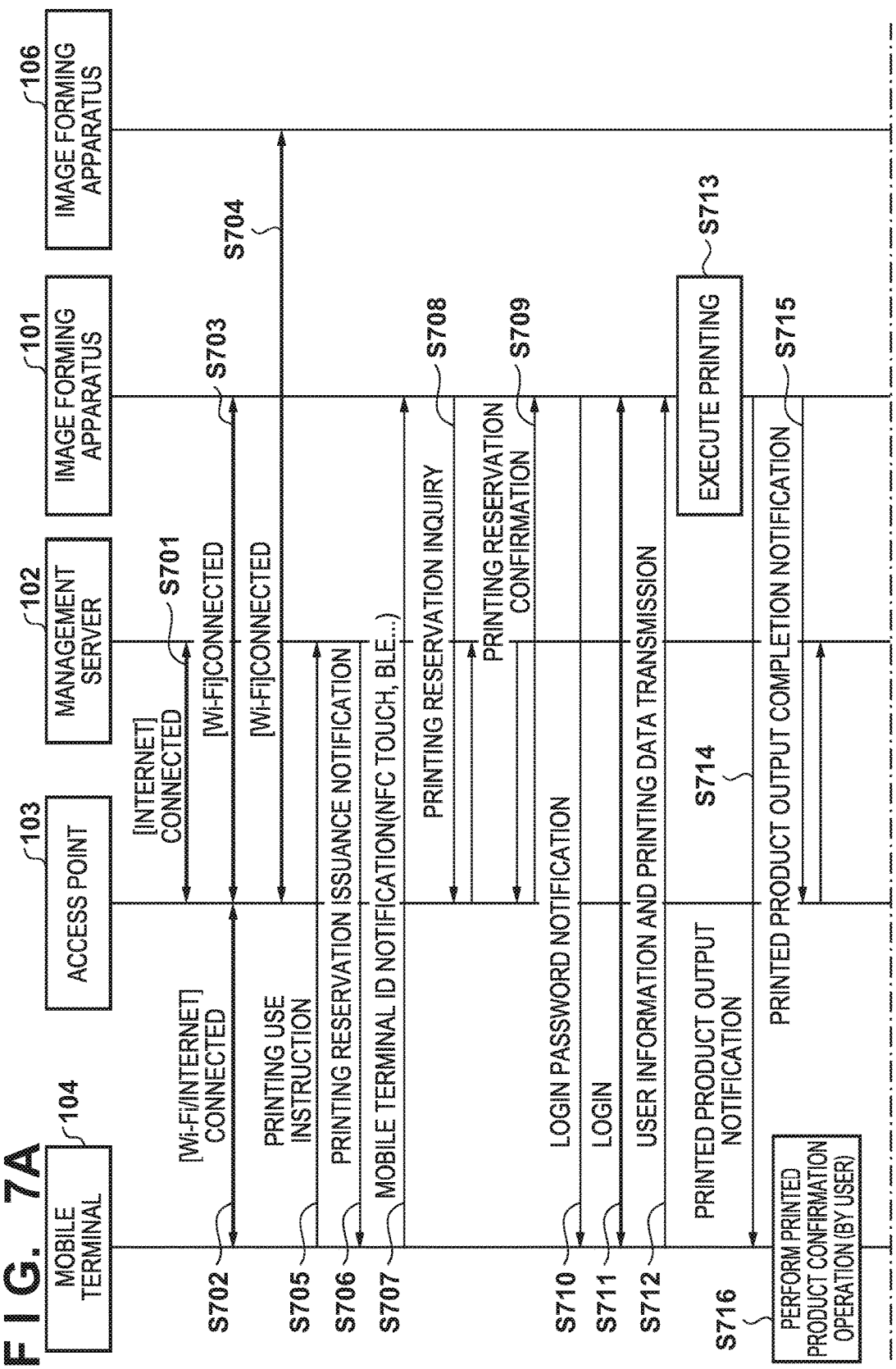

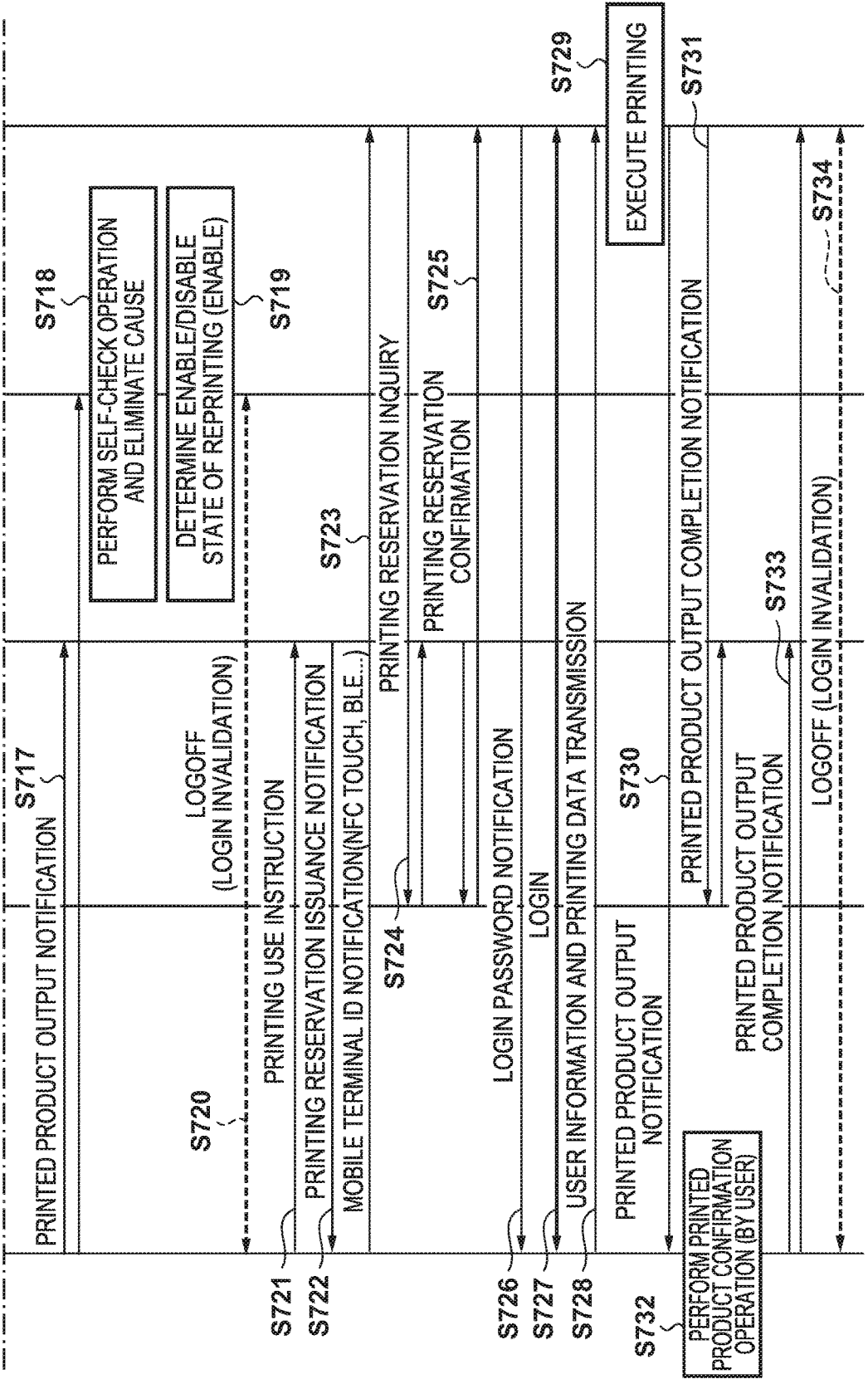

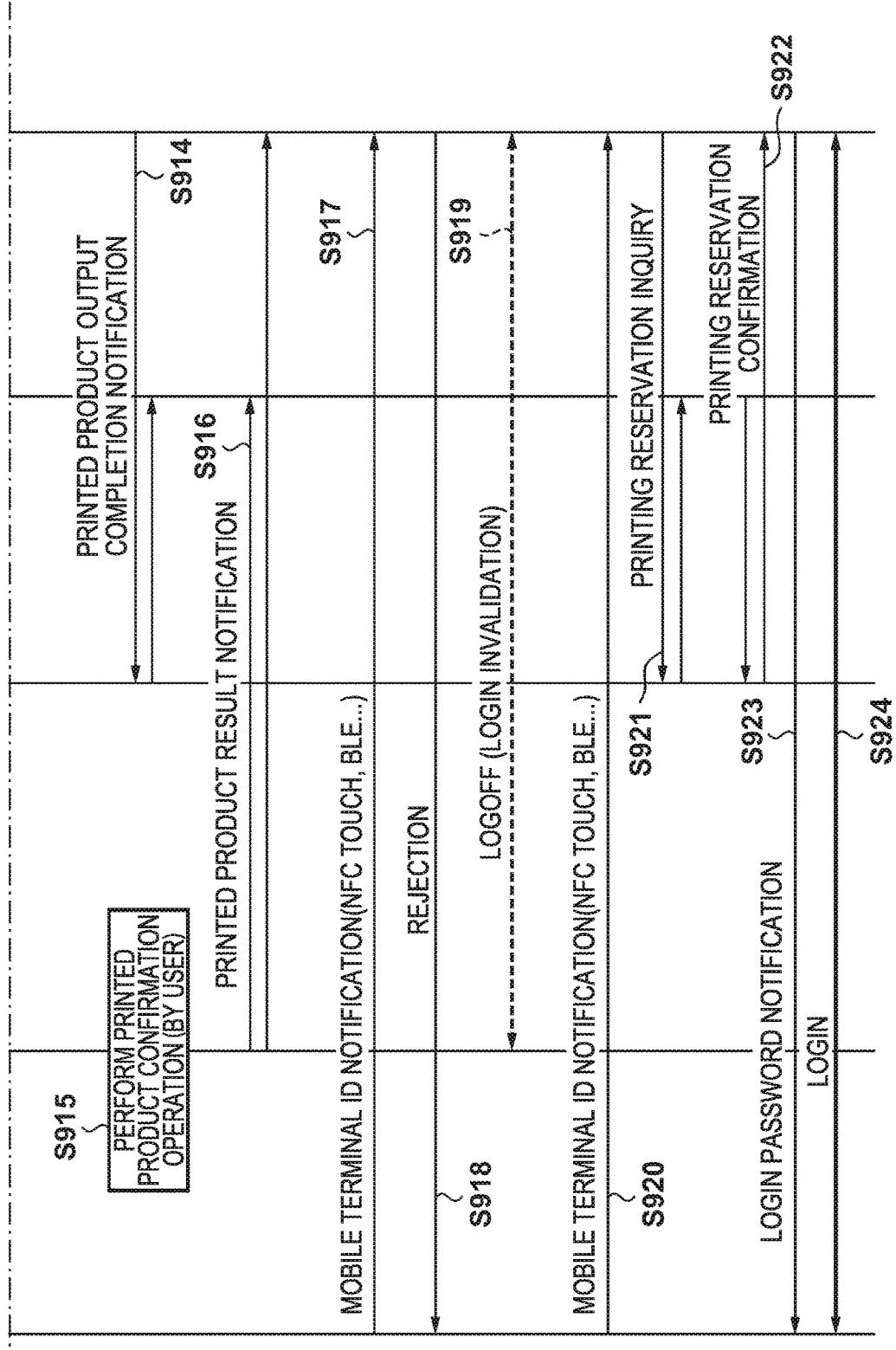

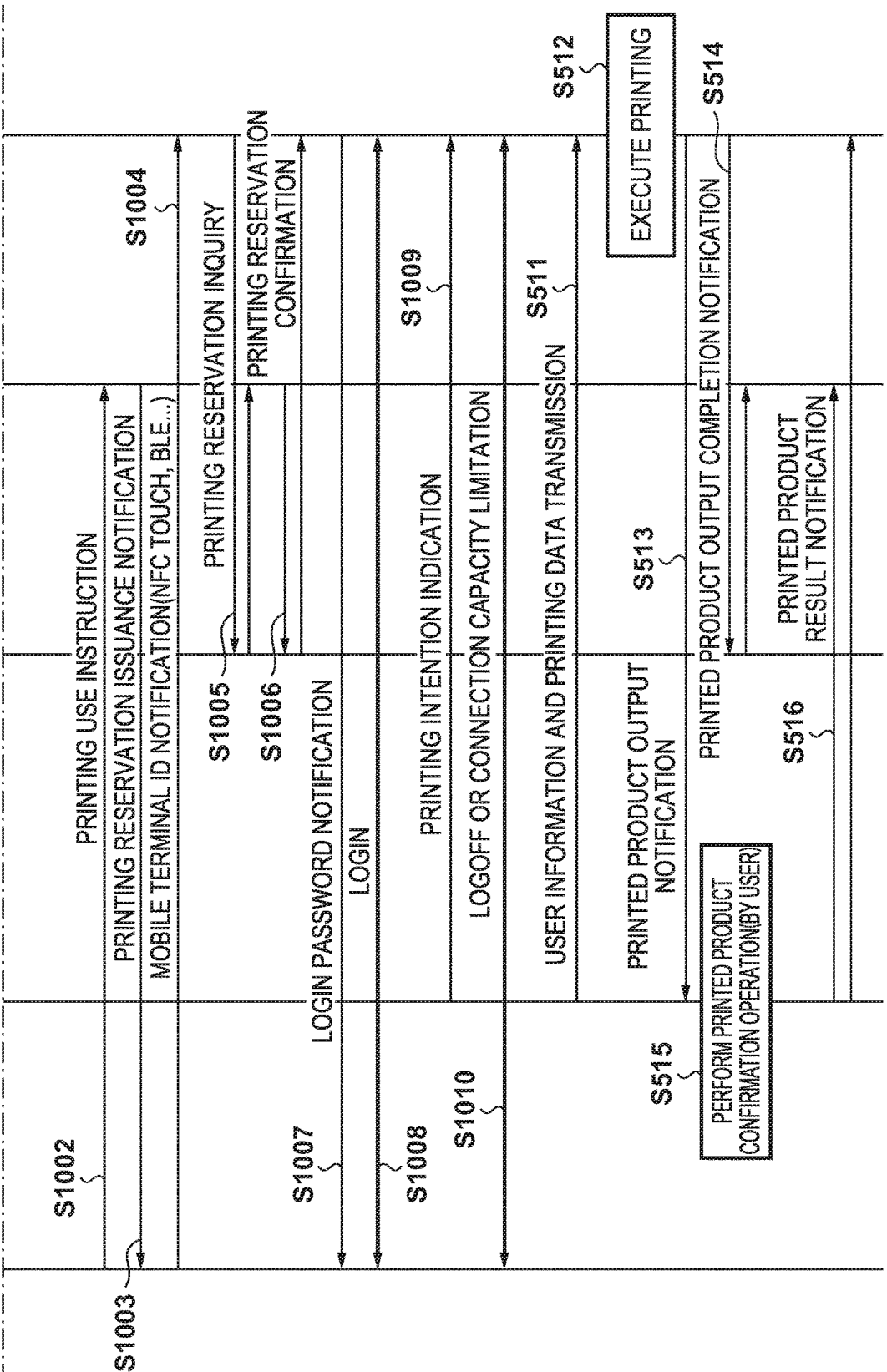

PRINTING SYSTEM AND RELATED CONTROL METHOD IN WHICH A PRINTING APPARATUS CONNECTS WITH A MOBILE TERMINAL IF A PRINTING RESERVATION CORRESPONDING TO A PRINTING INSTRUCTION FROM THE MOBILE TERMINAL IS MANAGED BY A SERVER

This application is a continuation of International Patent Application No. PCT/JP2017/002458, filed Jan. 25, 2017, which claims the benefit of Japanese Patent Application No. 2016-041491, filed on Mar. 3, 2016, both of which are hereby incorporated by reference in their entireties.

BACKGROUND OF THE INVENTION

Field of the Invention

The present invention relates to a printing system and a related control method.

Background Art

Of printing systems in which a management system, an accounting system, a mobile terminal, and a plurality of image forming apparatuses can be connected via a network, there is proposed a system for performing pay printing of a printing job issued by a mobile terminal satisfying predetermined requirements, as discussed, for example, in Japanese Patent Laid-Open No. 2015-215854.

In the printing system of Japanese Patent Laid-Open No. 2015-215854, resources, such as communication resources, must be released by a user operation at the end of printing, so that Wireless Fidelity (Wi-Fi®) communication or short range communication continues unless the user intentionally disconnects the communication. In this case, various kinds of applications installed on the mobile terminal continue communication regardless of the intention of the user, and the communication band continues to be used.

These kinds of communications are not particularly prioritized. For this reason, performance degradation may occur, such that, since a predetermined number or more of mobile terminals are connected, a given mobile terminal neither performs short range communication nor performs printing, the communication capacity required for printing is reduced, and the communication speed in data transmission, or the like, is reduced.

Even in general mobile printing, an operation for performing disconnection at the end of printing may be required and performed, but the disconnection timing must be decided by the user. For this reason, this system is not a positive system for a commercial purpose of increasing the printing cycle.

SUMMARY OF THE INVENTION

According to the present invention, printing performance degradation is prevented by appropriately performing connection control between apparatuses in a printing system used by an unspecified large number of users.

In order to solve the above problem, the present invention has the following arrangement. That is, in one aspect, the present invention provides a printing system in which a management server, a mobile terminal, and an image forming apparatus can be connected via a network, the management server comprising a management unit configured to issue a printing reservation in accordance with a request from a user and manage the printing reservation, and a notifying unit configured to notify information concerning the printing reservation managed by the management unit in accordance with an inquiry, and the image forming apparatus comprising an accepting unit configured to accept a printing instruction from the mobile terminal, an inquiring unit configured to inquire whether the management server manages a printing reservation corresponding to a printing instruction when the accepting unit accepts the printing instruction, a transmitting unit configured to transmit connection information to the mobile terminal if the printing reservation corresponding to the printing instruction is managed as a result of an inquiry by the inquiring unit, a connecting unit configured to set communication with the mobile terminal as a connected state when a connection request from the mobile terminal using the connection information transmitted by the transmitting unit is received, an obtaining unit configured to obtain printing data corresponding to the printing instruction from the mobile terminal set in the connected state, and a processing unit configured to execute printing processing using the printing data obtained by the obtaining unit, and the connecting unit sets communication with the mobile terminal to an unconnected state after execution of the printing processing by the processing unit is complete.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a view showing an example of the hardware arrangement of a system.

FIGS. 2A to 2C are block diagrams showing an example of the hardware arrangements of the respective units.

FIGS. 6A and 6B are sequence charts showing a processing sequence according to the first embodiment.

FIGS. 7A and 7B are sequence charts showing a processing sequence according to the first embodiment.

FIGS. 9A and 9B are sequence charts showing a processing sequence according to the first embodiment.

FIGS. 10A and 10B are sequence charts showing a processing sequence according to the second embodiment.

DESCRIPTION OF THE EMBODIMENTS

First Embodiment

System Arrangement

A printing system according to this embodiment is configured to include a management server 102, one or a plurality of mobile terminals (in this case, two mobile terminals 104 and 105), and one or a plurality of image forming apparatuses (in this case, two image forming apparatuses 101 and 106). In addition, the printing system includes one or a plurality of access points 103 that can be used in communication between the respective units. The respective units can be connected by short range communication or via a wired/wireless Internet line/channel. The connection forms of this embodiment will be described later with reference to FIGS. 4A to 4C.

The management server 102 provides a printing service via the Internet 107 and manages the printing system and various kinds of information of a printing job according to this embodiment. Examples of the information managed by the management server 102 are user information of a user who uses the printing system, device information of an image forming apparatus included in the printing system, and a printing reservation (to be described later) issued based on a request from the user. The management server 102 can execute printing processing using each image forming apparatus included in the printing system according to this embodiment.

In the printing system according to this embodiment, one or a plurality of image forming apparatuses are arranged. The user causes a desired image forming apparatus to execute printing processing via the management server 102 to obtain a printed product. FIG. 1 shows an example in which two image forming apparatuses are included.

The mobile terminal is an information terminal carried by the user. For example, the user can request issuance of a printing reservation by accessing a Web site provided by the management server 102 via a Web browser (not shown) of the mobile terminal or using an application installed on the mobile terminal. The printing sequence of this embodiment will be described later.

Hardware Arrangement

Figure 2A:
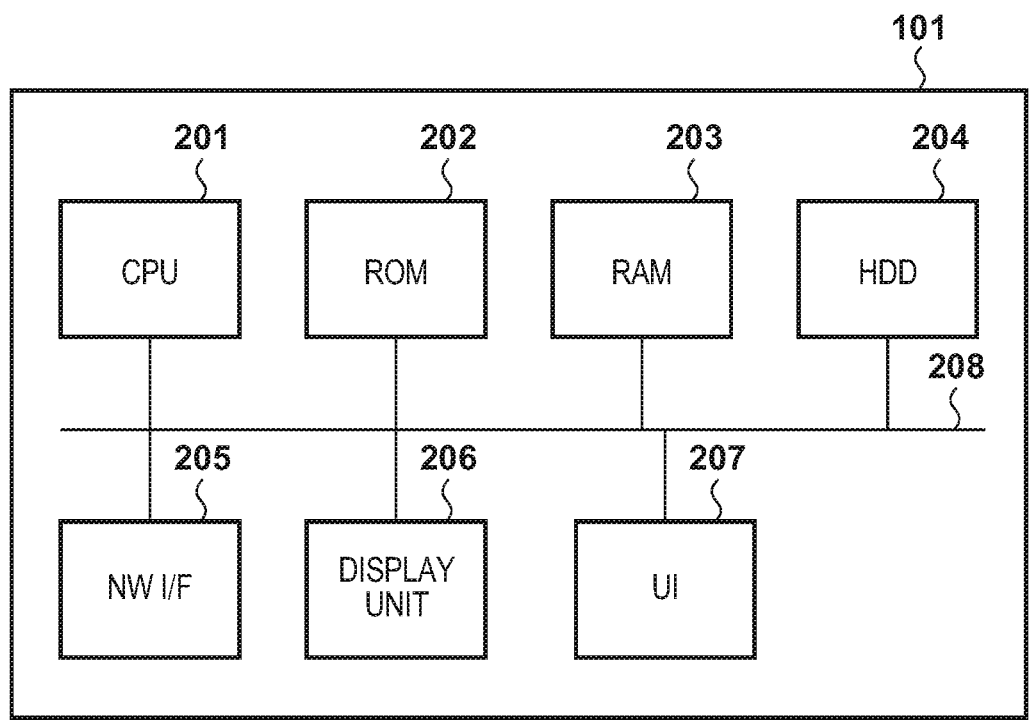

FIGS. 2A to 2C are block diagrams showing an example of hardware arrangements of the respective units according to this embodiment.

FIG. 2A shows an example of the hardware arrangement of the management server 102. A description will be made assuming that the management server 102 is an information processing apparatus and has the same arrangement as a general information processing apparatus. A central processing unit (CPU) 201 controls the overall information processing apparatus. The CPU 201 reads out various kinds of programs stored in a read only memory (ROM) 202, a hard disk drive (HDD) 204, or the like, and executes the programs to implement, for example, processing according to the present invention.

The ROM 202 is a nonvolatile storage unit and stores various kinds of programs. A random access memory (RAM) 203 is a volatile storage unit and is used as, for example, a work memory in processing of the CPU 201. The HDD 204 is a nonvolatile storage unit, stores various kinds of programs, and holds the processing results. A network interface (NW I/F) 205 performs communication with an external device via the Internet 107. A display unit 206 functions as a user interface and displays various kinds of information to the user. A user interface (UI) 207 is a user interface, such as a mouse or a keyboard, for accepting an operation from the user. The constituent elements in the information processing apparatus are communicably connected to each other via a bus 208.

FIG. 2B shows an example of the hardware arrangement of each of the mobile terminals 104 and 105. In this case, the mobile terminals 104 and 105 have the same arrangement, and a description will be made by exemplifying the mobile terminal 104. Note that in this embodiment, a smartphone is assumed as the mobile terminal 104, but the mobile terminal 104 is not limited to a smartphone. A device that can be carried by the user, such as a mobile personal computer (PC), a tablet terminal, or a digital camera may be used as the mobile terminal 104. A CPU 211 controls the overall mobile terminal 104. The CPU 211 reads out various kinds of programs stored in a ROM 212, a RAM 213, or the like, and executes the programs to implement, for example, processing according to the present invention.

The ROM 212 is a nonvolatile storage unit and stores various kinds of programs. The RAM 213 is a volatile storage unit and is used as, for example, a work memory in processing of the CPU 211. A secure disk (SD) 214 is a nonvolatile storage unit such as a flash memory (for example, an SD card), stores various kinds of programs, and holds the processing results. A Global Positioning System (GPS) 215 is a system for finding its own position information by using an artificial satellite. The function in the GPS 215 is a known technique, and a detailed description thereof will be omitted. A display unit 216 functions as a user interface and displays various kinds of information to the user. The display unit 216 also functions as an interface, such as a touch panel, and accepts an operation from the user. A camera 217 is an image capturing device and performs image capturing based on an instruction from the user.

A short range communication control unit 218 is used to cause the mobile terminal 104 to perform short range communication directly with each of various kinds of external devices without communicating through the Internet 107. This embodiment will exemplify that the mobile terminal 104 and the image forming apparatus 101 can perform short range communication. Note that the standard of the short range communication is not limited to a specific standard, and any standard or method can be used if the present invention is applicable. Wireless short range communication is, however, desirable. A Wireless Fidelity (Wi-Fi®) control unit 219 is an arrangement for controlling communication by Wi-Fi® (Wireless Fidelity) as one of the wireless local area network (LAN) standards. The WiFi® control unit 219 can use a predetermined Wi-Fi® spot (public wireless communication network). A mobile communication control unit 220 is an arrangement for controlling communication using a communication service provided by a specific communication carrier. The mobile communication control unit 220 is connected to a public network, such as the Internet 107, via the communication service. The CPU 211 in the mobile terminal 104 is connected to respective constituent elements to control those elements.

FIG. 2C is a block diagram showing an example of the hardware arrangement of each of the image forming apparatuses 101 and 106. In this case, the image forming apparatuses 101 and 106 have the same arrangement, and a description will be made by exemplifying the image forming apparatus 101. A CPU 221 controls the overall image forming apparatus 101. The CPU 221 reads out various kinds of programs stored in a ROM 222, a RAM 223, or the like, executes the programs, and implements, for example, processing according to the present invention.

The ROM 222 is a nonvolatile storage unit and stores various kinds of programs. The RAM 223 is a volatile storage unit and is used as a work memory in, for example, processing of the CPU 221. An HDD 224 is a nonvolatile storage unit, stores various kinds of programs, and holds the processing results. An NW I/F 225 performs communication with an external device via the Internet 107 (mainly by wired connection). A display unit 226 functions as a user interface and displays various kinds of information to the user. In addition, the display unit 226 functions as an interface, such as a touch pad, and accepts an operation from the user. A scanner unit 227 is a reading device and reads an original, or the like, based on an instruction of the user. A printer unit 228 is a printing device, prints an image based on a printing job, and outputs a printed product. A short range communication control unit 229 is used to cause the image forming apparatus 101 to directly communicate with each of various kinds of external devices without being through the Internet 107. In this embodiment, it is assumed that the image forming apparatus 101 can directly perform short range communication with the mobile terminal 104. A Wi-Fi® control unit 230 is an arrangement for controlling communication by Wi-Fi®. The CPU 221 in the image forming apparatus 101 is connected to the respective constituent elements to control those elements.

Note that the respective units illustrated above are merely examples of portions required to perform processing according to this embodiment, and may include other constituent elements.

Software Arrangement

Figure 3A:
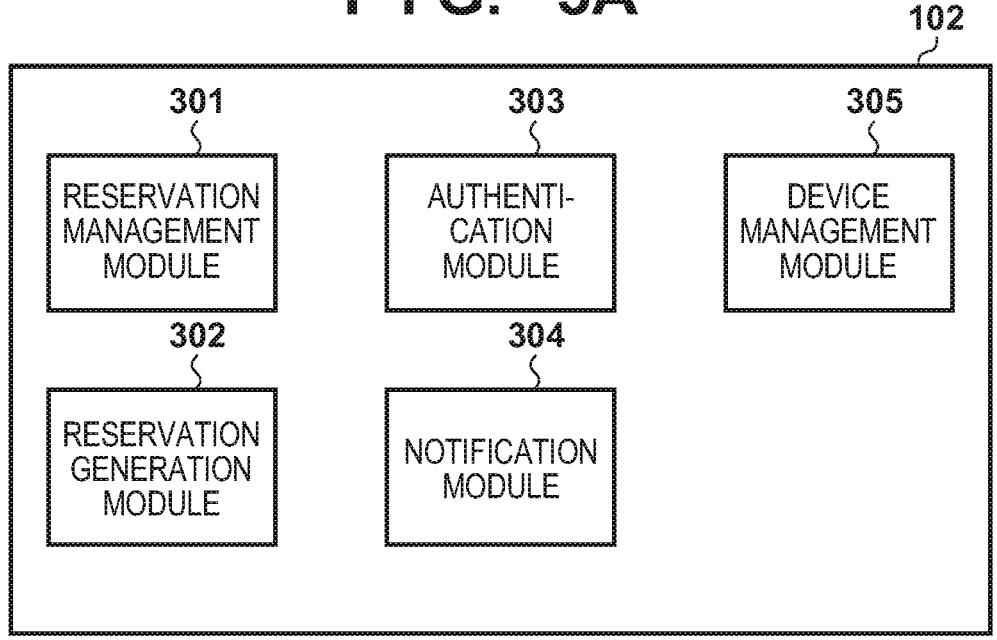
FIGS. 3A and 3B are block diagrams showing an example of the software arrangements of the respective modules.
Figure 3B:
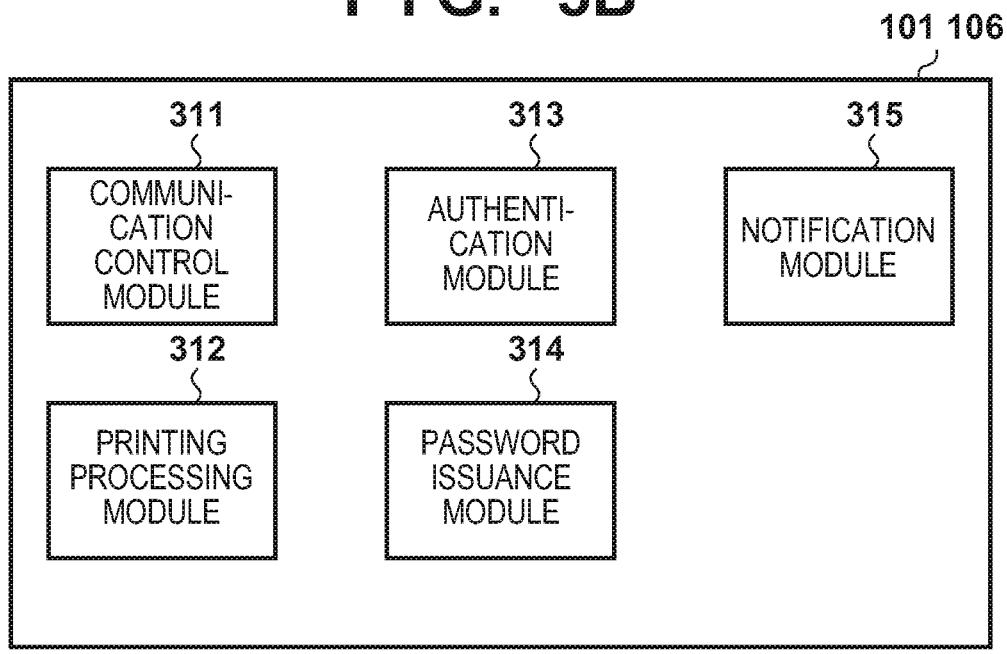

FIGS. 3A and 3B are block diagrams showing an example of software arrangements of the respective modules according to this embodiment. Note that each information used in software may be held in a different table in one physical storage unit, or may be managed by distributing pieces of information in a plurality of tables. Note that data on the management server 102 may be managed by an external device.

FIG. 3A is a block diagram showing an example of the software arrangement of the management server 102. The management server 102 includes a reservation management module 301, a reservation generation module 302, an authentication module 303, a notification module 304, and a device management module 305. The reservation management module 301 manages a reservation (to be referred to as a printing reservation hereafter) for printing processing generated in accordance with a user request. The reservation generation module 302 generates printing reservation information in accordance with the user request. The information to be generated here corresponds to an identification (ID) (identification information) for uniquely identifying the printing reservation. The authentication module 303 manages the user of the network printing service provided by the management server 102 and performs user authentication in accordance with an inquiry. The notification module 304 notifies the mobile terminal used by the user or the image forming apparatus of printing reservation information and information associated with the status of the printing processing of the processing. The device management module 305 manages information of the image forming apparatus corresponding to the network printing service provided by the management server 102.

FIG. 3B is a block diagram showing an example of the software arrangement of the image forming apparatus 101. The image forming apparatus 101 includes a communication control module 311, a printing processing module 312, an authentication module 313, a password issuance module 314, and a notification module 315. The communication control module 311 controls communication with the management server 102 and the mobile terminal 104. The printing processing module 312 performs printing processing using printing reservation information received from the management server 102 and the printing data received from the mobile terminal 104. Note that processing by the printing processing module 312 includes a printing operation performed by controlling the printer unit 228 of the image forming apparatus 101. The authentication module 313 performs authentication of a user who uses the network printing service. The password issuance module 314 issues a password for determining whether the user (mobile terminal) who has requested the printing reservation execution is an authentic user at the time of reception of the printing reservation execution request received from the management server 102. The notification module 315 notifies the mobile terminal used by the user and the management server 102 of job information, processing status information, and the like.

Note that each processing module described above merely exemplifies the portion required for performing processing of this embodiment, and other constituent elements may be included.

Connection Formed Between Apparatuses

In this embodiment, at the time of actual printing, the user who carries the mobile terminal reaches (approaches) near the image forming apparatus, and connects the mobile terminal to the image forming apparatus in addition to the connection having been performed so far between the mobile terminal and the management server. That is, the communication between the mobile terminal, the image forming apparatus, and the management server is established. The connection between the mobile terminal and the management server is the Internet connection via an access point, or the like. The connection between the mobile terminal and the image forming apparatus is the direct connection using short range communication or a connection using the wireless LAN. In addition, the image forming apparatus must also be connected to the management server.

For example, the following three connection forms are available as the connection forms between the respective apparatuses according to this embodiment.

Figure 4A:
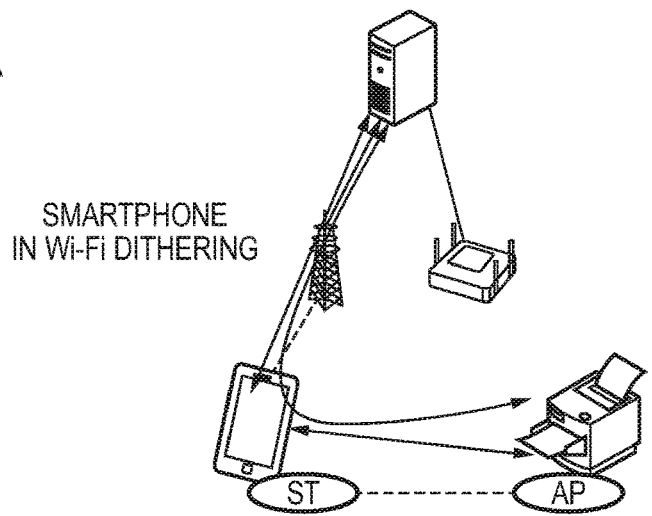
FIGS. 4A to 4C are views for explaining connection forms according to the present invention.

Connection Form 1: This is a form in which the image forming apparatus uses the dithering function of the mobile terminal and is connected to the management server via the mobile terminal (FIG. 4A). At this time, the mobile terminal can be connected to the management server using the Internet line/channel.

Figure 4B:
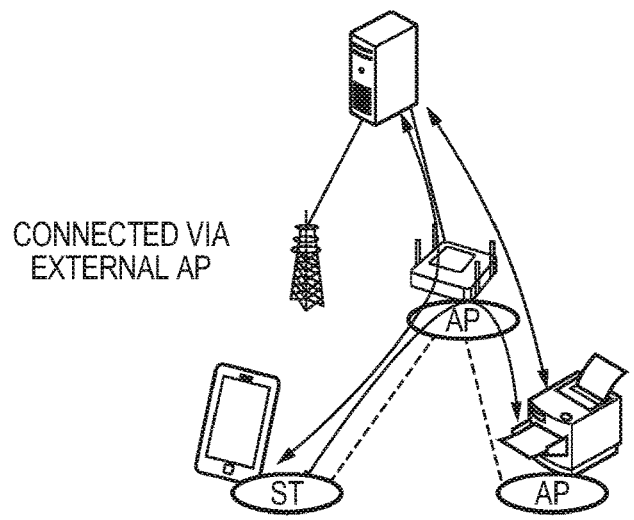

Connection Form 2: This is a form in which the mobile terminal and the image forming apparatus are connected to each other via the access point (FIG. 4B).

Figure 4C:
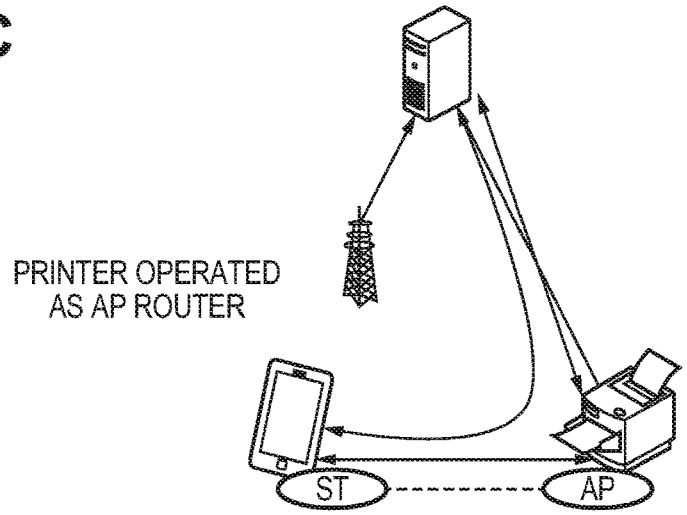

Connection Form 3: This is a form in which the image forming apparatus includes a function of a network router or access point, and the mobile terminal is connected to the management server via the image forming apparatus (FIG. 4C).

Explanation of Operation of Printing System

Next, an operation of the printing system according to this embodiment from the connection of the mobile terminal to the end of execution of the printing will be described by exemplifying the connection form in FIG. 4B. The basic processing sequences in the remaining connection forms, shown in FIGS. 4A to 4C, are, however, identical to each other. Note that in the following description, a state in which the mobile terminal is connected to the image forming apparatus by short range communication is referred to as a login state, and a state in which the mobile terminal is not connected to the image forming apparatus is referred to as a logoff state.

Case in which Printing is Normal

Figure 5:
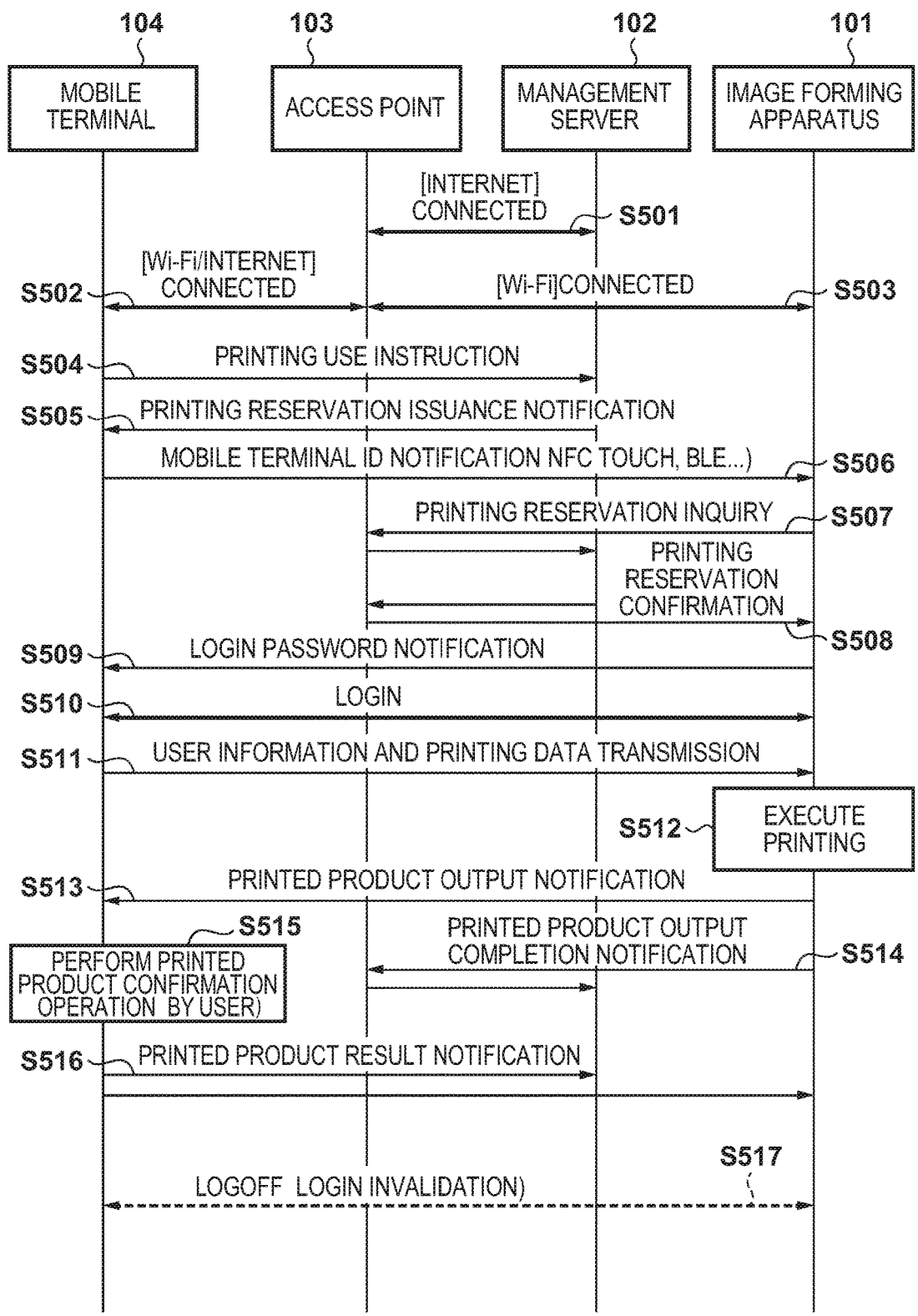
FIG. 5 is a sequence chart showing a processing sequence according to the first embodiment.

A printing operation in the normal state will be described with reference to FIG. 5.

As in the connection form shown in FIG. 4B, in steps S501 to S503, the management server 102 is connected to the access point 103 by Internet communication. The mobile terminal 104 is connected to the access point 103 by Internet communication or Wi-Fi® communication. The image forming apparatus 101 is connected to the access point 103 by Wi-Fi® communication.

In step S504, the management server 102 accepts an instruction for using the printing service from the mobile terminal 104 by the Internet communication, or the like. As described above, this instruction may be generated by an application (not shown) installed on the mobile terminal 104 or may be generated by accessing the Web site provided by the management server 102 via a Web browser (not shown) of the mobile terminal 104. The mobile terminal 104 transmits, to the management server 102 as the printing use instruction, information of the image forming apparatus 101 that is supposed to perform printing processing, specific information (a file name, or the like) for specifying the printing data as the printing target, the mobile terminal ID, and the printing reservation ID including the user information. Note that the pieces of information to be transmitted are merely examples, and other pieces of information may be included. These pieces of information are not those issued on the mobile terminal side, but may be pieces of information newly issued by the management server 102 based on the use request from the user.

In step S505, the management server 102 issues a printing reservation in response to the printing use instruction and sends the printing reservation issuance notification to the mobile terminal 104. As the printing reservation issuance notification, the printing reservation ID and the information of the image forming apparatus as the target are included. Note that processing in steps S504 and S505 need not always be performed near the image forming apparatus 101. This processing is performed by the mobile terminal 104 and the management server 102 at an arbitrary timing in response to the user request.

In step S506, when the user who carries the mobile terminal 104 comes close to the image forming apparatus 101, the mobile terminal 104 detects the image forming apparatus 101 by short range communication. The mobile terminal 104 notifies the image forming apparatus 101 of information, such as the mobile terminal ID, or the like, via this short range communication. Examples of short range communication are Near Field Communication (NFC), Bluetooth®, and Bluetooth® Low Energy (BLE).

In step S507, the image forming apparatus 101 transmits information obtained from the mobile terminal 104 to the management server 102 via the access point 103 and inquires whether the printing reservation corresponding to this information has been made. In this case, the information includes, for example, the printing reservation ID, and various kinds of information indicated by the printing use instruction and the printing reservation issuance notification used in the processing in steps S504 and S505, in addition to the mobile terminal ID received from the mobile terminal 104.

In step S508, the management server 102 collates information included in the received inquiry with the managed printing reservation information issued in step S505. The management server 102 sends this printing reservation confirmation result to the image forming apparatus 101 via the access point 103.

The image forming apparatus 101 confirms in step S509 from the printing reservation confirmation result from the management server 102 that the information received from the mobile terminal 104 and the issued printing reservation information match. In this case, the match indicates that the printing reservation has been made by the mobile terminal 104 that has made short range communication. If the printing reservation is confirmed, the image forming apparatus 101 notifies the mobile terminal 104 of a login password. The login password used as the connection information may be a one-time password having a limited use period.

In step S510, the user transmits, via the mobile terminal 104, a connection request to the image forming apparatus 101 using the login password notified from the image forming apparatus 101 and logs in to the image forming apparatus 101. This makes it possible to establish the connection state between the mobile terminal 104 and the image forming apparatus 101, that is, to set a printable state by the image forming apparatus 101. Note that when the login password is received from the image forming apparatus 101, the mobile terminal 104 may be automatically logged in to the image forming apparatus 101 upon confirmation of the reservation without causing the user to input the password again. In this case, an arbitrary method may be selected for the login sequence by settings of an application in the mobile terminal 104.

In step S511, the mobile terminal 104 sends a printing instruction by using short range communication, such as NFC communication, Bluetooth® communication, or the like. At this time, the mobile terminal 104 transmits the user information of the mobile terminal 104 and printing data associated with the printing reservation to the image forming apparatus 101.

In step S512, the image forming apparatus 101 performs printing processing corresponding to the printing reservation using various kinds of information received in step S511 and outputs a printed product. Note that a trigger for executing the printing processing corresponding to the printing reservation may not be short range communication between the mobile terminal 104 and the image forming apparatus 101. For example, an arrangement for specifying the image forming apparatus 101 using an input unit mounted in the mobile terminal 104 (for example, a Quick Response Code (QR Code®) may be captured using a camera), or an arrangement for inputting a user ID using an input unit of the image forming apparatus 101 may be employed. That is, any arrangement may be used if the service user and the image forming apparatus 101 can be paired.

In addition, the mobile terminal 104 and the image forming apparatus 101 may have higher wireless LAN functions, short range communication may be used to perform authentication necessary for wireless LAN communication and settings of communication parameters, and a handover operation performed by the wireless LAN may be performed for any other communication. With this arrangement, the communication time can be shortened for a large capacity of printing data, and the distance limitation in short range communication can be relaxed. In addition, a mechanism for notifying the image forming apparatus 101 that performs printing of printing data or its storage destination information stored on the network in place of the printing data stored in the mobile terminal 104 may be arranged.

In step S513, the image forming apparatus 101 notifies the mobile terminal 104 of a message indicating that the printed product is output. The notification to the mobile terminal 104 may be performed using short range communication or performed via the management server 102.

In step S514, the image forming apparatus 101 notifies the management server 102 of a completion notification indicating that the printed product is output. This completion notification is sent to the management server 102 via, for example, the access point 103.

In step S515, the user confirms the printed product output at the image forming apparatus 101. This confirmation is confirmation of an output size and quality by, for example, visual confirmation of the user. During this period, the mobile terminal 104 transmits the execution instruction of the printing operation corresponding to the printing reservation to the image forming apparatus 101, and then a confirmation result input screen (not shown) for inputting a user operation for determining whether the printed product is normally output is displayed. The image forming apparatus 101 then waits for the confirmation result input.

In step S516, the mobile terminal 104 transmits the printed product confirmation result (confirmation notification) input by the user to the management server 102 and the image forming apparatus 101. In this case, the printed product confirmation result is input in accordance with a case in which the quality, and the like, as a result of confirmation of the printed product by the user, conform to the user's desire. If the user judges that the printed product is normally output, the user inputs the judgment result on the confirmation result input screen. By this input, the image forming apparatus 101 recognizes that the printing ends correctly and performs subsequent processing (for example, accounting processing upon providing the printing service).

In step S517, the image forming apparatus 101 invalidates the login of the mobile terminal 104 when printing is executed normally. Note that the method of "login" based on the confirmation of the printing reservation has been exemplified, but is not limited to this particular method. For example, by Wi-Fi® connection/disconnection or the change in the upper limit of the communication capacity of the communication band is performed in place of the login, and control is performed such that the priority level of a mobile terminal that has made a printing reservation and the priority level of a mobile terminal that has not made a printing reservation may have a difference.

Case in which Printing Error has Occurred

An operation in a case in which a printing error has occurred will be described with reference to FIGS. 6A and 6B. Steps S601 to S615 are the same as steps S501 to S515 in FIG. 5, and a detailed description thereof will be omitted.

In step S616, if printing is not normally executed as a result of user's confirmation of the printed product output by the image forming apparatus 101, the user inputs a message indicating this via a confirmation result input screen (not shown). Along with this, the mobile terminal 104 transmits this message to the management server 102 and the image forming apparatus 101. At this time, the mobile terminal 104 keeps holding the state of login to the image forming apparatus 101.

In step S617, the image forming apparatus 101 checks the image forming apparatus itself to perform printing again. At this time, a cause by which the image forming apparatus itself cannot output a normal printed product may be eliminated, or the elimination of a cause by which printing cannot be performed may be instructed to the user.

In step S618, as a result of the check operation, the image forming apparatus 101 determines whether printing can be performed again.

If the image forming apparatus 101 determines that printing can be performed again, the image forming apparatus 101 performs the printing operation again in step S619. The start timing of re-execution may be, for example, the start at which a re-execution instruction is accepted from the mobile terminal 104.

In steps S620 to S623, the image forming apparatus 101 performs processing for the printing operation. This processing is the same as that in steps S613 to S616.

If a normal printed product is output by re-processing, and normal printing is executed, the image forming apparatus 101 invalidates the login of the mobile terminal 104 in step S624. Note that, if no normal printed product is output even in re-processing, the printing operation may be performed again, or the processing sequence may be forcibly ended as a result of an abnormal end because another cause is present. In this case, the image forming apparatus 101 notifies the mobile terminal 104 and the management server 102 of a determination result together with the printing reservation information.

Case in which a Printing Error has Occurred

An operation for handing over the printing operation corresponding to the printing reservation to another image forming apparatus 106 at the time of occurrence of a printing error will be described with reference to FIGS. 7A and 7B. Steps S701 to S703 and steps S705 to S717 are the same as steps S501 to S516 in FIG. 5, and a description thereof will be omitted.

In step S704, the image forming apparatus 106 and the access point 103 are connected by Wi-Fi® connection.

In step S718, the image forming apparatus 101 performs the check operation of the image forming apparatus itself for performing printing again.

In step S719, the image forming apparatus 101 determines as a result of the check operation whether reprinting can be performed again.

If the image forming apparatus 101 determines that reprinting is impossible, the image forming apparatus 101 invalidates the login of the mobile terminal 104 in step S720. At this time, the image forming apparatus 101 may notify the mobile terminal 104 and the management server 102 of a printing failure together with the printing reservation.

If the user wants to hand over the failed printing operation to another image forming apparatus 106, the user sends a printing use instruction for handover of the printing job to the management server 102 in step S721. This processing is the same as that in step S504 of FIG. 5. After that, the same processing as in the processing of steps S505 to S516 in FIG. 5 is executed in steps S722 to S733.

Subsequently, in step S734, the image forming apparatus 101 invalidates the login of the mobile terminal 104.

The case in which printing use instruction is made from the beginning has been described here. The present invention is not limited, however, to this case. For example, at the time of handover, processing (that is, steps S720 to S725) corresponding to steps S504 to S509 may be omitted, and the management server 102 may hand over the information in the image forming apparatus 101 for the printing reservation for the image forming apparatus 106. For example, if the user, or the like, designates an image forming apparatus used to execute printing in a printing use instruction or a printing reservation, the information must be updated to the information of the image forming apparatus serving as the handover destination at the time of handover. Note that, if the user does not want to hand over the information to another image forming apparatus, printing may be interrupted without handing over the information to another image forming apparatus, as shown in FIGS. 6A and 6B. In this case, after the login to the image forming apparatus 101 is invalidated, the processing is ended, and subsequent processing (for example, processing associated with fee payment) upon the printing service is not executed.

In this case, the method of handing over the printing processing from the image forming apparatus 101 to another image forming apparatus 106 using the mobile terminal 104 has been described above, but the present invention is not limited to this particular method. For example, a new printing reservation ID may be assigned to another mobile terminal in place of the mobile terminal 104 to reissue a printing reservation, and the image forming apparatus 106 that has handed over the printing operation of the same printing contents may perform printing processing using this printing reservation ID.

Figure 8:
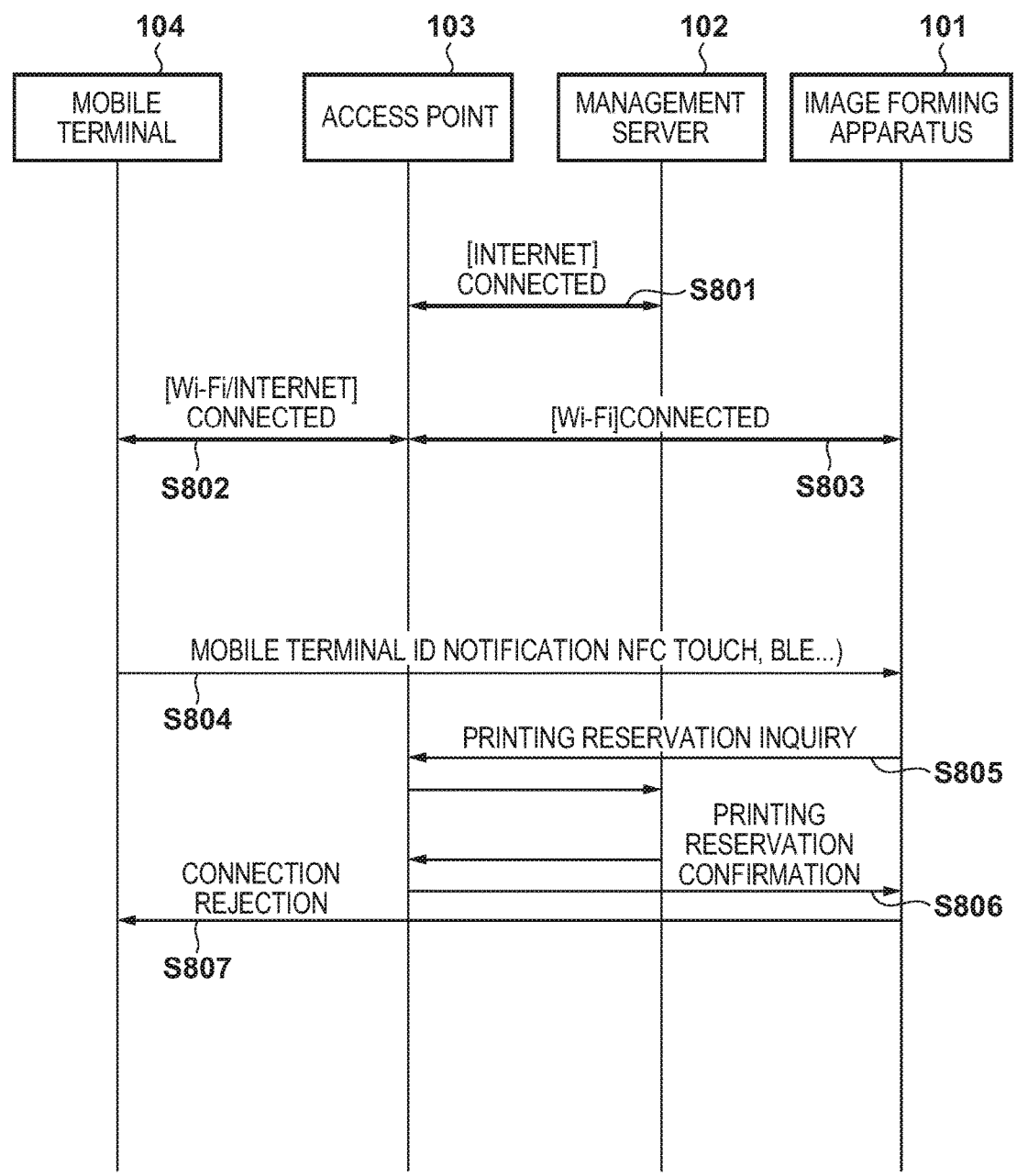
FIG. 8 is a sequence chart showing a processing sequence according to the first embodiment.

Case in which Access is Made from Mobile Terminal that has No Printing Reservation An operation in a case in which access is made from a mobile terminal 104 that has no printing reservation will be described with reference to FIG. 8. Steps S801 to S806 are the same as steps S501 to S503 and S506 to S508 in FIG. 5, and a description thereof will be omitted.

If it is determined, as a result of printing reservation confirmation, that the printing reservation is not normally performed, the image forming apparatus 101 rejects the login from the mobile terminal 105 in step S807. Note that if the communication capacity between the mobile terminal 104 and the image forming apparatus 101 is less than a predetermined amount, the login need not be rejected, and a connection between the mobile terminal 105 and the image forming apparatus 101 may be permitted. Alternatively, the connection communication capacity may be controlled to be limited without rejecting the login.

Figure 9A:
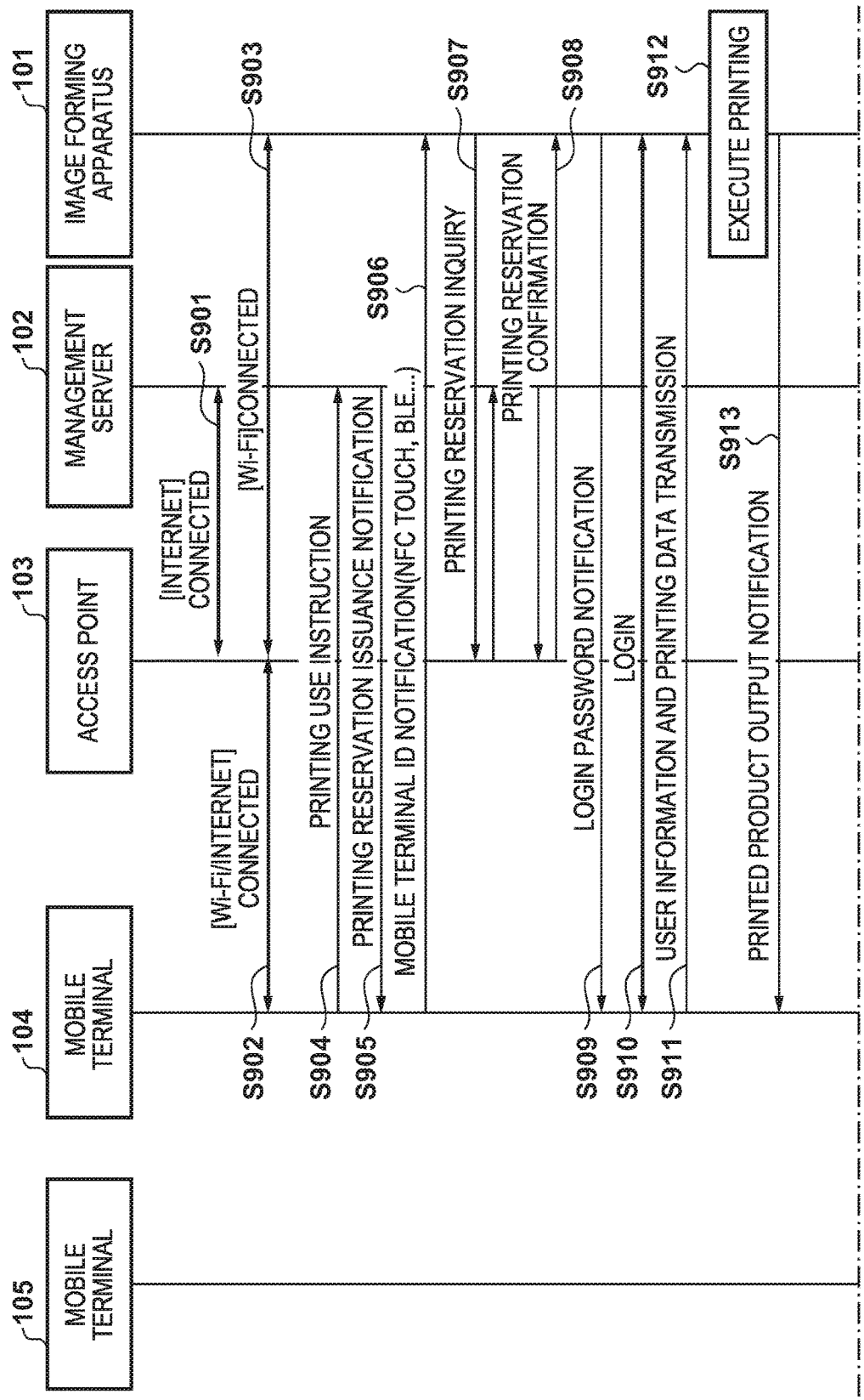

Access from Another Mobile Terminal During Access from Mobile Terminal with Printing Reservation An operation in a case in which another mobile terminal 105 accesses the image forming apparatus 101 during the access of the mobile terminal 104 with a reservation will be described with reference to FIGS. 9A and 9B. Steps S901 to S916 are the same as steps S501 to S516 in FIG. 5, and a description thereof will be omitted.

In step S917, during the login of the mobile terminal 104 with a printing reservation, the image forming apparatus 101 receives a connection request from another mobile terminal 105.

In step S918, the image forming apparatus 101 rejects the connection from the mobile terminal 105. At this time, as shown in FIG. 8, upon confirmation of the printing reservation, the image forming apparatus 101 may reject the connection when no printing reservation is set in the mobile terminal 105.

In step S919, the image forming apparatus 101 invalidates the login of the mobile terminal 104 with the printing reservation by the end, or the like, of the printing operation.

In steps S920 to S924, the mobile terminal 105 is connected to the image forming apparatus 101 to log in to the image forming apparatus 101. This processing is the same as the processing sequence of step S506 to 510 of FIG. 5.

A case in which the connection of the mobile terminal 105 is rejected when the mobile terminal 105 accesses the image forming apparatus 101 after the result of the printed product is notified in step S916 has been described above. The present invention is not limited to this case. If the connection with the mobile terminal 104 having the printing reservation is maintained, the connection of the mobile terminal 105 is rejected even in a case other than the above case. Note that if the communication capacity associated with the connection between the mobile terminal 105 and the image forming apparatus 101 is small even during the connection of the mobile terminal 104, the connection of the mobile terminal 105 may be permitted.

Note that in the above processing sequence, the description has been made in the connection form of FIG. 4B, but the same basic operation is performed even in the other remaining two connection forms. In addition, the above sequence order is not fixed to the above case, and another arrangement may be employed if necessary information can be exchanged.

As described above, in response to the connection request from the mobile terminal, the inquiry of the printing reservation to the management server is made, printing is permitted for the mobile terminal with the printing reservation, and printing is rejected for the mobile terminal without the printing reservation. This makes it possible to solve the problem in which, since other mobile terminals of a predetermined number or more are connected to the image forming apparatus, the mobile terminal that has made the connection request cannot be subjected to the Wi-Fi® connection to disable printing. In addition, the communication capacity necessary for printing can be ensured, and a shortening of the time for communication, such as data transmission, can be achieved, and degradation of performance can be prevented. In addition, the connection is interrupted upon confirmation of the end of printing, thereby disabling the maintenance of an unnecessary connection. As a result, according to the present invention, in the printing system used by the unspecified large number of users, the network resources can be assigned reliably to the printing users, and wasteful waiting time can be minimized to execute printing processing.

Second Embodiment

The embodiment that limits the communication capacity of another mobile terminal when a mobile terminal with a printing reservation indicates the printing intention based on the printing reservation in a state in which a plurality of mobile terminals are connected to an access point will be described below.

Explanation of Operation of Printing System

Figure 10A:
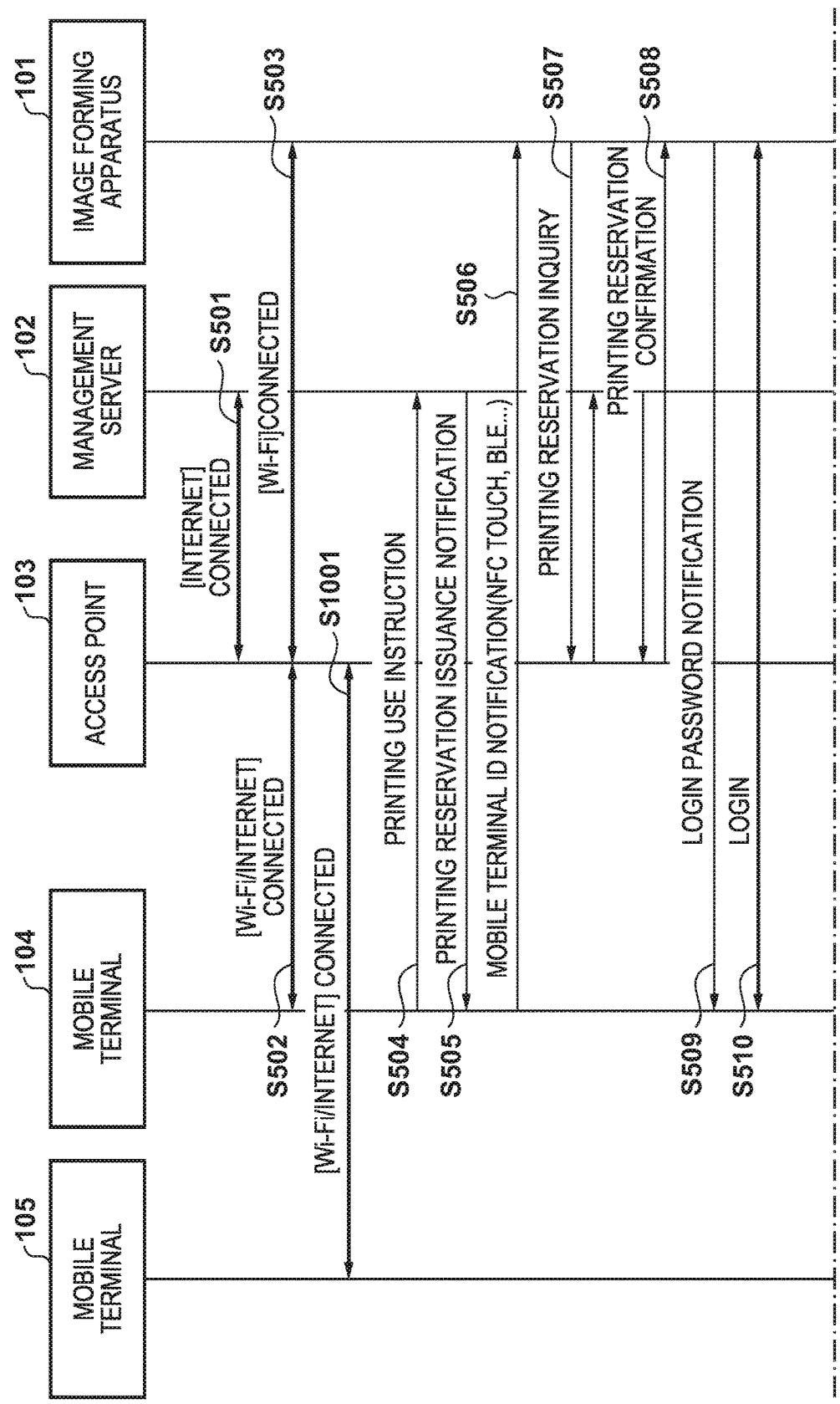

An operation according to this embodiment will be described with reference to FIGS. 10A and 10B by exemplifying the connection form of FIG. 4B, as in the first embodiment. The same reference numerals denote the same processing in FIG. 5 described in the first embodiment, and a description thereof will be omitted.

In steps S501 to S503, a mobile terminal 104, an access point 103, a management server 102, and an image forming apparatus 101 are connected by Internet communication or Wi-Fi® communication.

In addition, in step S1001, a mobile terminal 105 is connected to the access point 103 by Internet communication or Wi-Fi® communication.

In steps S504 to S510, the mobile terminal 104 logs in to the image forming apparatus 101, and the mobile terminal 104 and the image forming apparatus 101 are set in the connected state, that is, printing can be performed in the image forming apparatus 101.

In addition, in steps S1002 to S1008, the mobile terminal 105 logs in to the image forming apparatus 101, and the mobile terminal 105 and the image forming apparatus 101 are set in the connected state, that is, printing can be performed in the image forming apparatus 101. Processing in steps S1002 to S1008 is the same as the processing in steps S504 to S510. At this time, both the mobile terminal 104 and the mobile terminal 105 are set in a state of login to the image forming apparatus 101.

In step S1009, the mobile terminal 104 indicates the printing intention by short range communication to the image forming apparatus 101 via a display screen (not shown) displayed on the mobile terminal 104.

In step S1010, the image forming apparatus 101 releases the connection for a mobile terminal (in this case, the mobile terminal 105) that does not indicate the printing intention among the mobile terminals logged in to the image forming apparatus 101 at present, or limits the communication capacity and uses a function associated with the connection. That is, the image forming apparatus 101 limits the connection of a mobile terminal other than the mobile terminal that indicates the printing intention, thereby controlling to ensure the communication resources necessary for causing the mobile terminal that indicates the printing intention to perform the printing operation.

After that, in steps S511 to S516, the mobile terminal 104 and the image forming apparatus 101 execute the printing operation.

In the state in which the plurality of mobile terminals that have made the printing reservations are logged in to the image forming apparatus via the access point, when a given mobile terminal indicates the printing intention based on the printing reservation, the logoff of another mobile terminal, limitation of the connection communication capacity, and limitation of the use function are executed. This makes it possible to ensure the communication capacity necessary for printing for a mobile terminal that is about to perform printing. As a result, the time required for communication, such as data transmission, can be shortened, and degradation of performance can be prevented.

According to the present invention, connection control between apparatuses can be appropriately performed in the printing system used by an unspecified large number of users.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A printing system in which a management server, a mobile terminal, and an image forming apparatus can be connected via a network, the printing system including:
   (A) the management server that comprises:
      (a) at least one memory storing first instructions; and
      (b) at least one processor executing the first instructions to cause the management server:
         (i) to issue a printing reservation in accordance with a request from a user;
         (ii) to manage the issued printing reservation; and
         (iii) to provide information concerning the managed printing reservation to the user, in response to an inquiry; and
   (B) the image forming apparatus that comprises:
      (a) at least one memory storing second instructions; and
      (b) at least one processor executing the second instructions to cause the image forming apparatus:
         (i) to accept a printing instruction from the mobile terminal;
         (ii) to send an inquiry to the management server as to whether the management server manages a printing reservation corresponding to the accepted printing instruction;
         (iii) to transmit connection information to the mobile terminal if the printing reservation corresponding to the accepted printing instruction is managed by the management server as a result of the inquiry;
         (iv) to set communication with the mobile terminal as a connected state when a connection request from the mobile terminal using the transmitted connection information is received;
         (v) to obtain printing data corresponding to the printing instruction from the mobile terminal set in the connected state;
         (vi) to execute printing processing using the obtained printing data; and
         (vii) to set communication with the mobile terminal to an unconnected state after execution of the printing processing is complete,
   wherein, if the printing reservation corresponding to the accepted printing instruction is not managed by the management server as a result of the inquiry, the printing instruction accepted from the mobile terminal is rejected and the connection information is not transmitted to the mobile terminal.

2. The printing system according to claim 1, wherein the at least one processor of the image forming apparatus further executes the second instructions to cause the image forming apparatus:
   (viii) to accept a confirmation result indicating whether a printed product is normally output by the execution of the printing processing;
   (ix) to determine whether re-execution of the printing processing is possible when a confirmation result indicating that the printed product is not normally output is received; and
   (x) to set communication with the mobile terminal to the unconnected state if the re-execution is impossible.

3. The printing system according to claim 1, wherein the at least one processor of the image forming apparatus further executes the second instructions to cause the image forming apparatus (viii) to reissue, when a printing operation based on a printing reservation fails in the image forming apparatus, a new printing reservation that hands over information of the failed printing reservation.

4. The printing system according to claim 3, wherein the new printing reservation includes one of a printing reservation issued so as to be executed by another image forming apparatus that is different from the image forming apparatus, and a printing reservation issued from another mobile terminal that is different from the mobile terminal, so as to make a printing instruction.

5. The printing system according to claim 1, wherein the at least one processor of the image forming apparatus further executes the second instructions to cause the image forming apparatus:
  (viii) to accept an execution instruction of printing processing from one mobile terminal, of a plurality of mobile terminals, set in a connected state; and
  (ix) to set a mobile terminal, other than the one mobile terminal, of the plurality of mobile terminals, set in the connected state, to an unconnected state.

6. The printing system according to claim 1, wherein the at least one processor further executes the second instructions to cause the image forming apparatus:
  (viii) to accept an execution instruction of printing processing from one mobile terminal, of a plurality of mobile terminals, set in a connected state; and
  (ix) to limit a communication capacity with a mobile terminal other than the one mobile terminal.

7. A control method in a printing system in which a management server, a mobile terminal, and an image forming apparatus can be connected via a network, the method comprising:
  (A) in the management server:
    (a) issuing a printing reservation in accordance with a request from a user;
    (b) managing the issued printing reservation; and
    (c) providing information concerning the managed printing reservation to the user, in response to an inquiry; and
  (B) in the image forming apparatus;
    (a) accepting a printing instruction from the mobile terminal;
    (b) sending an inquiry to the management server as to whether the management server manages a printing reservation corresponding to the accepted printing instruction;
    (c) transmitting connection information to the mobile terminal if the printing reservation corresponding to the accepted printing instruction is managed by the management server as a result of the inquiry;
    (d) setting communication with the mobile terminal as a connected state when a connection request from the mobile terminal using the transmitted connection information is received;
    (e) obtaining printing data corresponding to the printing instruction from the mobile terminal set in the connected state;
    (f) to executing printing processing using the obtained printing data; and
    (g) setting communication with the mobile terminal to an unconnected state after execution of the printing processing is complete,
  wherein, if the printing reservation corresponding to the accepted printing instruction is not managed by the management server as a result of the inquiry, the printing instruction accepted from the mobile terminal is rejected and the connection information is not transmitted to the mobile terminal.

8. The control method according to claim 7, further comprising, in the image forming apparatus:
  (h) accepting a confirmation result indicating whether a printed product is normally output by the execution of the printing processing;
  (i) determining whether re-execution of the printing processing is possible when a confirmation result indicating that the printed product is not normally output is received; and
  (j) setting communication with the mobile terminal to the unconnected state if the re-execution is impossible.

9. The control method according to claim 7, further comprising, in the image forming apparatus (h) reissuing, when a printing operation based on a printing reservation fails in the image forming apparatus, a new printing reservation that hands over information of the failed printing reservation.

10. The control method according to claim 9, wherein the new printing reservation includes one of a printing reservation issued so as to be executed by another image forming apparatus that is different from the image forming apparatus, and a printing reservation issued from another mobile terminal that is different from the mobile terminal, so as to make a printing instruction.

11. The control method according to claim 7, further comprising, in the image forming apparatus:
  (h) accepting an execution instruction of printing processing from one mobile terminal, of a plurality of mobile terminals, set in a connected state; and
  (i) setting a mobile terminal, other than the one mobile terminal, of the plurality of mobile terminals, set in the connected state, to an unconnected state.

* * * * *